June 27, 1961 W. H. ALBEE 2,990,026
VEHICLE COMPRISING A FLEXIBLE-WALLED, FLUID-DISTENSIBLE,
GROUND-CONTACTING AND LOAD-SUPPORTING ROLLER
Filed Oct. 17, 1956 9 Sheets-Sheet 1

INVENTOR.
WILLIAM H. ALBEE
BY Willard D. Eakin
ATTORNEY

*INVENTOR.*
WILLIAM H. ALBEE
BY
*Willard D. Eakin*
ATTORNEY

FIG. 6

INVENTOR.
WILLIAM H. ALBEE
BY Willard D. Eakin
ATTORNEY

June 27, 1961 W. H. ALBEE 2,990,026
VEHICLE COMPRISING A FLEXIBLE-WALLED, FLUID-DISTENSIBLE,
GROUND-CONTACTING AND LOAD-SUPPORTING ROLLER
Filed Oct. 17, 1956 9 Sheets-Sheet 6

INVENTOR.
WILLIAM H. ALBEE
BY Willard D. Eakin
ATTORNEY

June 27, 1961 W. H. ALBEE 2,990,026
VEHICLE COMPRISING A FLEXIBLE-WALLED, FLUID-DISTENSIBLE,
GROUND-CONTACTING AND LOAD-SUPPORTING ROLLER
Filed Oct. 17, 1956 9 Sheets-Sheet 7

INVENTOR.
WILLIAM H. ALBEE
BY Willard D. Eakin
ATTORNEY

FIG. 19

INVENTOR.
WILLIAM H. ALBEE
BY Willard D. Eakin
ATTORNEY

United States Patent Office 2,990,026
Patented June 27, 1961

2,990,026
VEHICLE COMPRISING A FLEXIBLE-WALLED, FLUID-DISTENSIBLE, GROUND-CONTACTING AND LOAD-SUPPORTING ROLLER
William H. Albee, Carmel, Calif., assignor, by mesne assignments, to John G. Holland, Houston, Tex.
Filed Oct. 17, 1956, Ser. No. 616,472
11 Claims. (Cl. 180—74)

This invention relates to vehicles in which the load is supported by one or more ground-contacting, load-supporting rollers such as are described and claimed, alone and in various combinations, in my U.S. Patent No. 2,714,011, granted July 26, 1955, and which has been reissued as Reissue Patent No. Re. 24,272, granted February 12, 1957, and copending applications Ser. No. 430,179, filed May 17, 1954, upon which Patent No. 2,802,541 was granted August 13, 1957, and Ser. No. 567,137, filed February 23, 1956, upon which Patent No. 2,952,468 was granted September 13, 1960.

Its chief objects are to provide improved means for peripherally loading such a roller and for peripherally driving such a roller; to provide for the use of a group of such rollers, for supporting heavy loads, without the necessity of employing the "walking-beam" principle for distribution of the load among the rollers as they move over an uneven roadway; to provide an improved load-supporting and steering assembly; to provide improved means for maintaining the axis of such a roller in symmetrical relation to the vehicle frame while permitting free relative movement of the said axis and the said frame for cushioning of the vehicle frame by the roller; to provide improved means for protecting such a roller from being damaged by road obstructions in the vicinity of relatively vulnerable parts of the roller near the ends of its axis and for serving as outrigger means against excessive lateral tilting of the roller; to provide vertical compactness of the means for peripherally loading and/or driving the roller, and thus to provide for a low center of gravity for the vehicle and its load while employing the cushioning ability of both the upper and the lower portions of the roller; to provide a plurality of vehicles adapted to be joined as a single vehicle, as in case of need for a wide flat-bed or other truck, or for a single assembly having large load-carrying capacity; to provide improved steering means enabling a single driver to handle the combined vehicles or to provide dual controls for the combined vehicles; to provide improved means for bringing a plurality of vehicles into and holding them in joined relation as a single unit; and to provide combinations having some or all of the advantages mentioned.

Referring to the drawings, the preferred embodiment here shown comprises a pair of individual vehicles adapted to be joined together side-by-side as a single, large-capacity vehicle, the two vehicles being of like construction except that as to some features they are constructed as respectively a right-hand and a left-hand member of the pair. Most of the features of the invention, however, are present in each of the individual vehicles and the invention is not limited to their adaptability to be joined as a pair or to their being constructed as right-hand and left-hand vehicles for that purpose.

Figure 1:
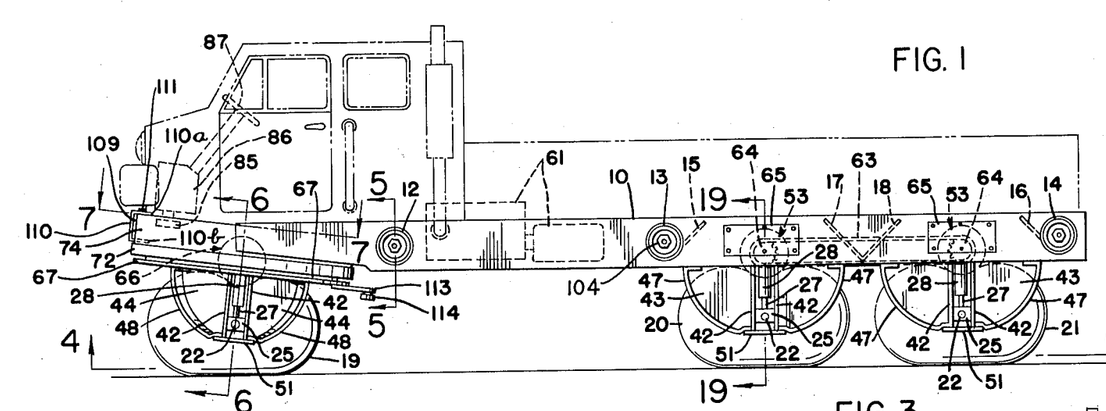
FIG. 1 is a side elevation of a vehicle embodying my invention in all of its several aspects, the vehicle there shown being the nearer one of two such vehicles joined as a unit.

The vehicle shown in FIG. 1, considered as the nearer one of two joined vehicles, will be used primarily for the description of the invention, the farther one being a mirror image of it except that it differs as to some of the details, as will become manifest as the description proceeds.

The frame of the individual vehicle comprises a pair of longitudinally extending box-beams 10 and 11 connected in spaced relation by tubular cross-members 12, 13, 14 of which 13 and 14 are supplemented by respective obliquely disposed bracing and strength-giving cross members 15, 16 of plate form welded to the box-beams and to the tubular cross-members. These members 15 and 16 serve also as smooth surfaced stops for limiting possible momentary extreme bulging of the fluid-distensible rollers without greatly resisting rotation of the rollers, and for the same purpose and for their strength-giving effect a pair of similar members 17, 18, in V relationship, connect the box-beams at a position midway between the tubular cross-members 13, 14 (FIG. 1).

Figure 2:
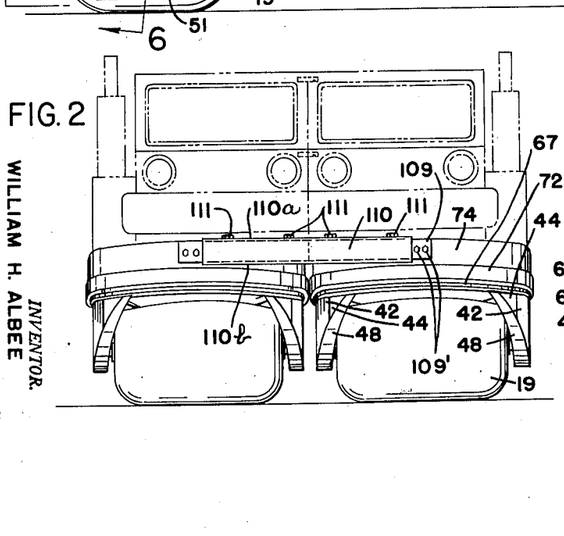
FIG. 2 is a front elevation of two such vehicles thus joined.
Figure 3:
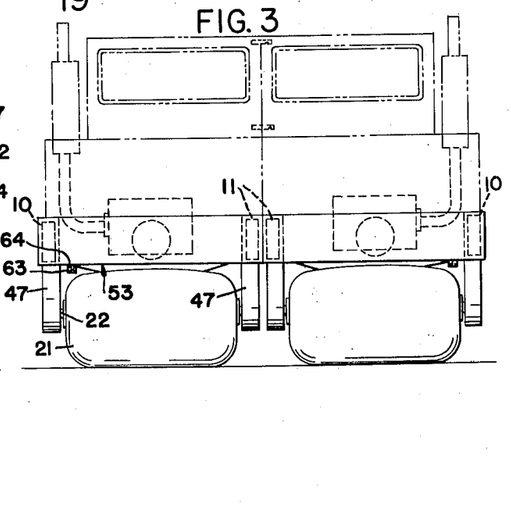
FIG. 3 is a rear elevation of the unitary assembly shown in FIG. 2.

The vehicle frame is supported by a front-end, fluid-distensible, peripherally-loaded, ground-contacting, roller or "bag" 19, preferably of crowned form, and a tandem pair of rear-end, fluid-distensible, peripherally-loaded, ground-contacting rollers or "bags" 20, 21, preferably also of crowned form. Each bag preferably is of cord-reinforced rubber construction, with a highly flexible and only slightly stretchable wall, and with a distension pressure as low as 10 or less pounds per square inch. By comparing FIGS. 1 and 2, it is seen that the footprints of the bags are of greater length in the direction of the rotational axis of the roller than in the direction of vehicle travel.

Each of the ground-contacting bags is provided with an axle 22 formed with a fluid passage 23 (FIG. 6) leading from an inflating valve 24 on an end of the axle, to the space external to the axle within the bag, for conducting air, water or other distending fluid into and out of the bag. At each end the axle is journaled in a journal block 25 which fits and is vertically slidable between a pair of guide-rails 26, 26 (see FIGS. 10, 19 and 20) which are rigid in relation to an adjacent chassis member. Each journal block is secured to the projecting lower end of the piston-rod 27 of a vertical cylinder 28 secured rigidly to an adjacent chassis member, as by a bracket 29 and bolts 31, 31 (FIGS. 8, 19 and 20), each cylinder assembly comprising bolts 30, 30 extending through the heads of the cylinder and through the mounting bracket 29. Each cylinder 28 is a part of the hydraulic equalizer device that is diagrammatically illustrated in FIG. 15.

Figures 15, 16, 17, 18:
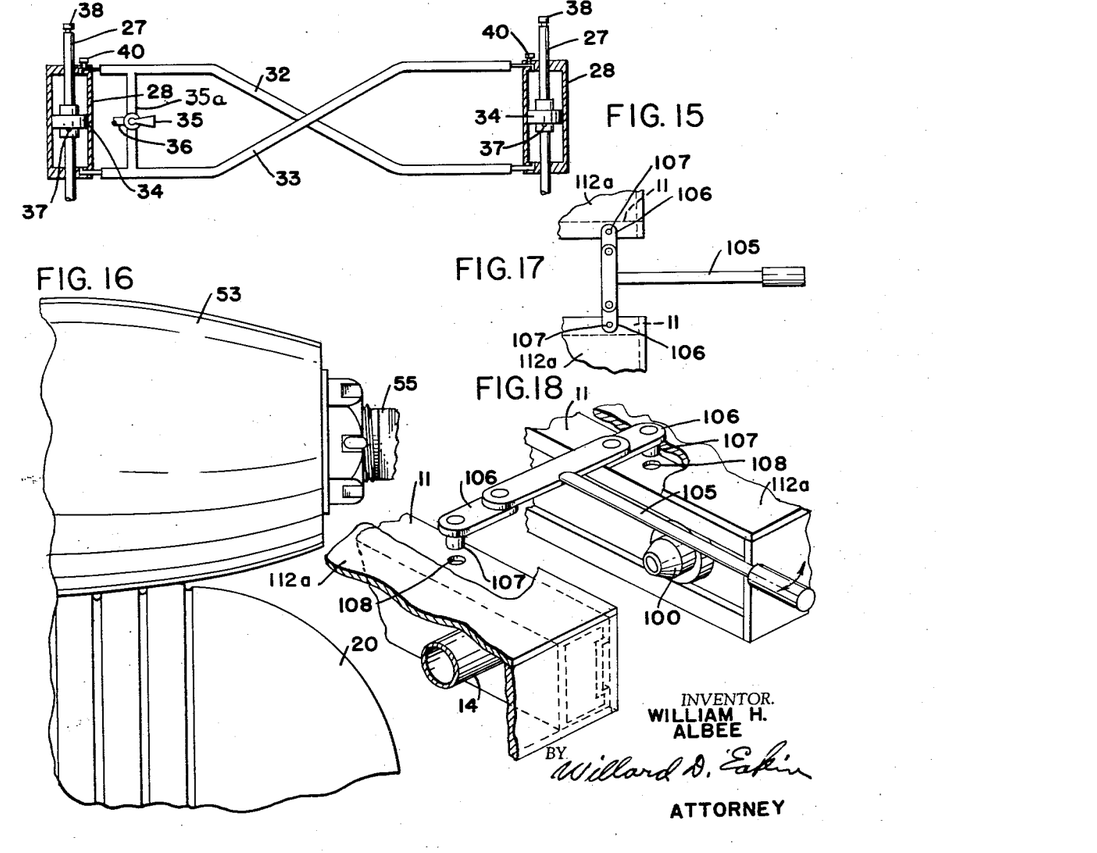
FIG. 15 is a diagrammatic elevation of parts of the equalizer assembly adapted to maintain the axis of each cushioning roller in symmetrical relation to the vehicle frame while permitting free relative movement of the two for cushioning of the vehicle frame by the roller.
FIG. 16 is a fragmentary elevation of parts of one of the cushioning rollers and a load-applying and/or driving roller that is mated with it.
FIG. 17 is a fragmentary plan view showing means for drawing the frames of two of the individual vehicles into joined relation as a single unit.
FIG. 18 is a perspective view of the same.

As shown in FIG. 15 each of the equalizer devices comprises crossed pipes 32, 33, the pipe 32 connecting the upper chamber of the left-hand cylinder 28 with the lower chamber of the right-hand cylinder 28 and the pipe 33 connecting the upper chamber of the right-hand cylinder with the lower chamber of the left-hand cylinder, this arrangement being such that free flow of fluid through the pipes 32, 33 permits the axle to move up and down freely in relation to the vehicle frame in parallel relation to it but prevents it from departing from such parallel relation, by compelling the two piston rods 27 to have the same vertical movements, the fluid system comprising the cylinders 28 and the crossed pipes 32, 33 being completely filled with hydraulic fluid. Each piston rod extends both upward and downward from the piston, 34, and slidably fits and projects through packings of equal internal size in the upper and lower cylinder heads, so that volume increase in either chamber of the cylinder will be equal to the volume decrease in the other chamber of the same cylinder, for a given movement of the piston.

The pipes 32, 33 are connected by a fluid conduit 35a inclusive of a control valve 35, FIG. 15, so that in case the pistons get out of their proper relative positions by reason of leakage they can be returned to their proper relative positions by setting the valve 35 at a position such that the pipes 32 and 33 are in communication with each other through the conduit 35a, which permits the cylinders, rigid with vehicle chassis members, to descend therewith, until the pistons are at the tops of their respective cylinders, or at such other like positions in their cylinders as may be determined by the use of spacer blocks or the like (not shown) manually inserted between the bearing blocks 25 and the respective cylinders, the vehicle frame being caused to descend by heavily loading it or by venting fluid from the peripherally-loaded bag.

Figures 9, 10, 11, 12, 13:
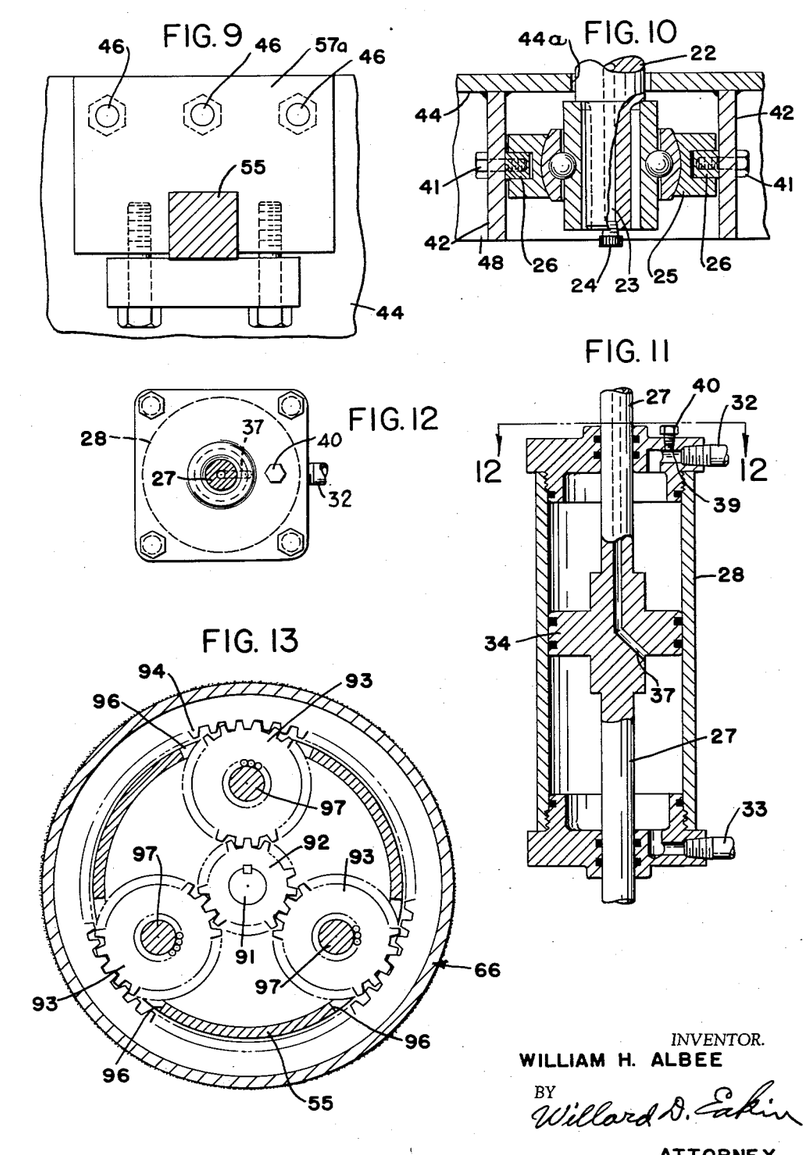
FIG. 9 is a section on line 9—9 of FIG. 7.
FIG. 10 is a section on line 10—10 of FIG. 8.
FIG. 11 is a section on line 11—11 of FIG. 6.
FIG. 12 is a section on line 12—12 of FIG. 11.
FIG. 13 is a section on line 13—13 of FIG. 6.

For originally filling the equalizer device with hydraulic fluid, and for replenishing the fluid after it has been depleted by leakage from the system, as distinguished from leakage past a piston, the valve 35 is so constructed that at one selective setting it will provide communication of the pipes 32 and 33 with each other and with a hydraulic-fluid supply pipe 36, FIG. 15, means being provided for venting air from each chamber of each cylinder, as by providing for each cylinder a controlled air vent 37; FIG. 11, leading from the lower face of the piston, through the piston rod, to a suitable valve 38 at the top end of the piston rod, and a controlled air vent 39 leading from the upper end of the upper chamber of the cylinder, through the cylinder head, to a suitable valve 40 on the upper cylinder head.

Figure 6:
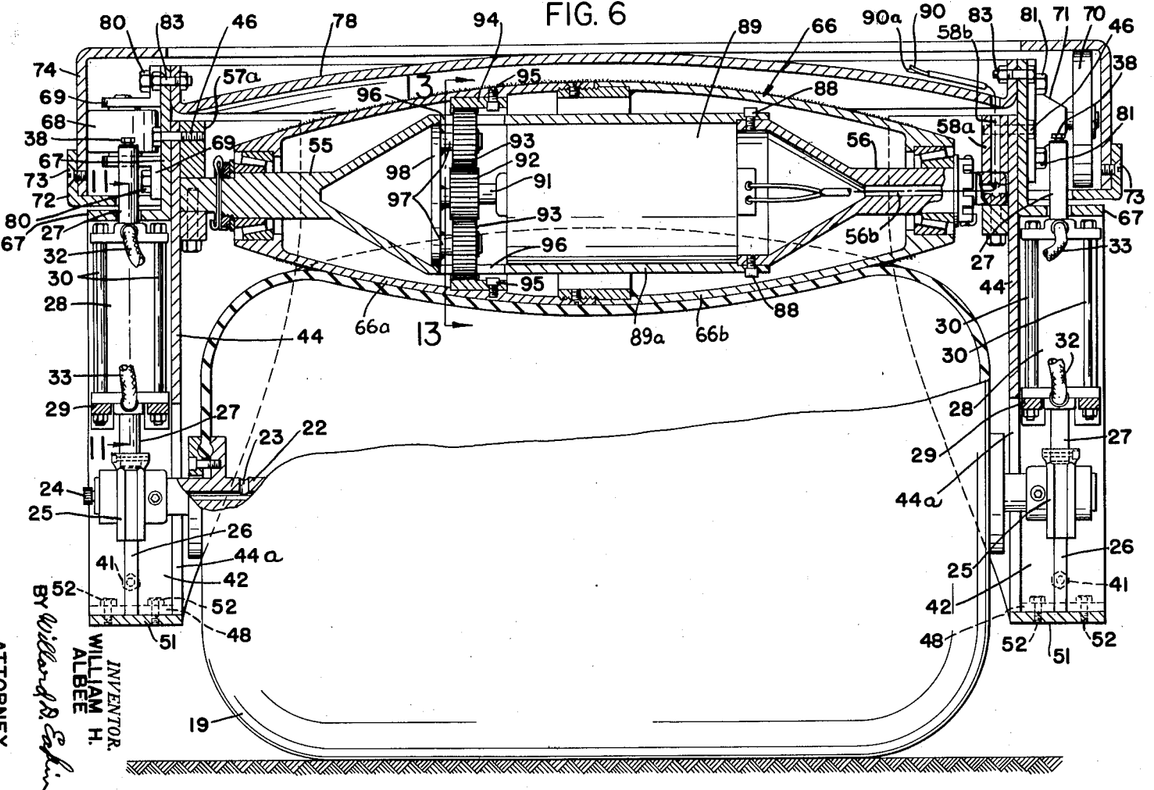
FIG. 6 is a section on line 6—6 of FIG. 1, with parts shown in elevation and broken away.
Figure 19:
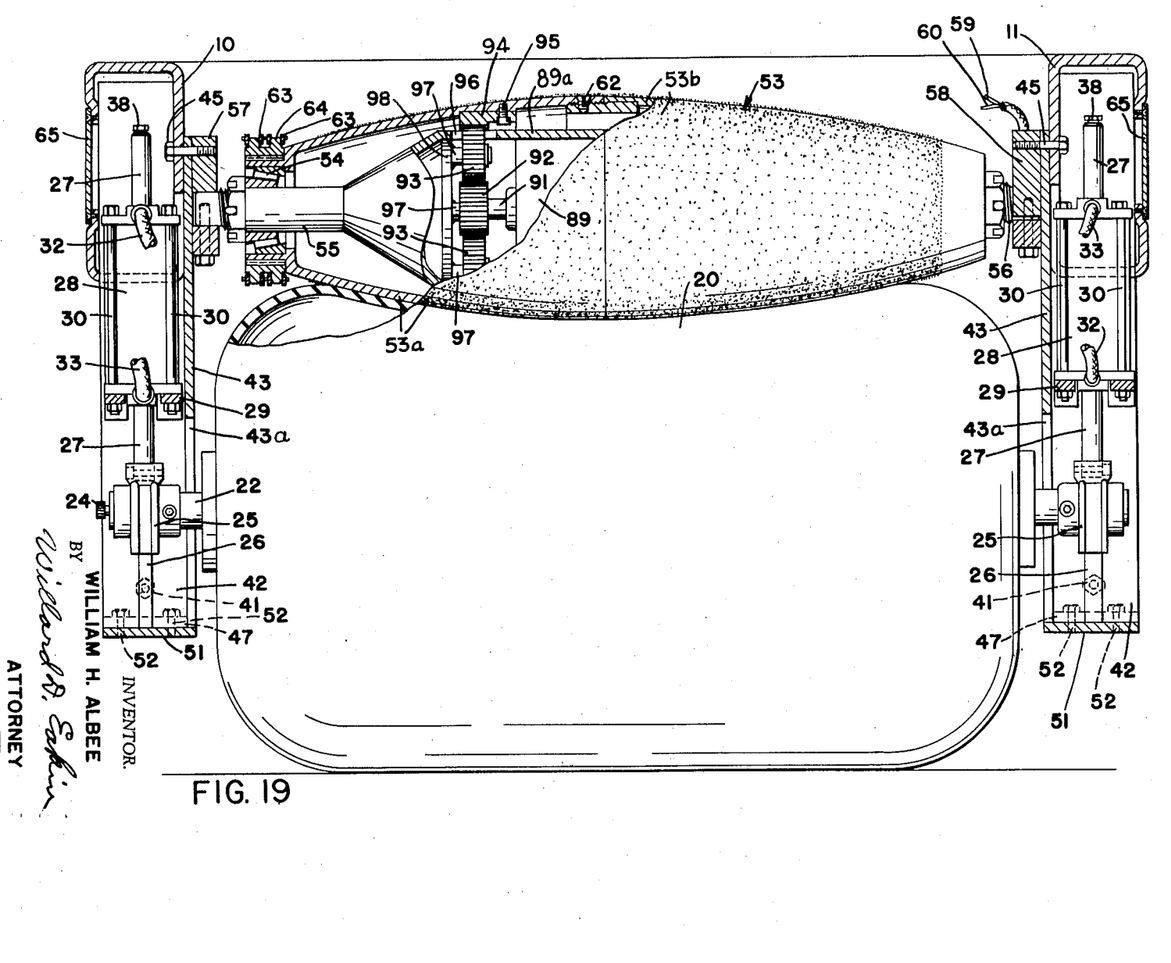
FIG. 19 is a section on line 19—19 of FIG. 1.
Figures 20, 21:
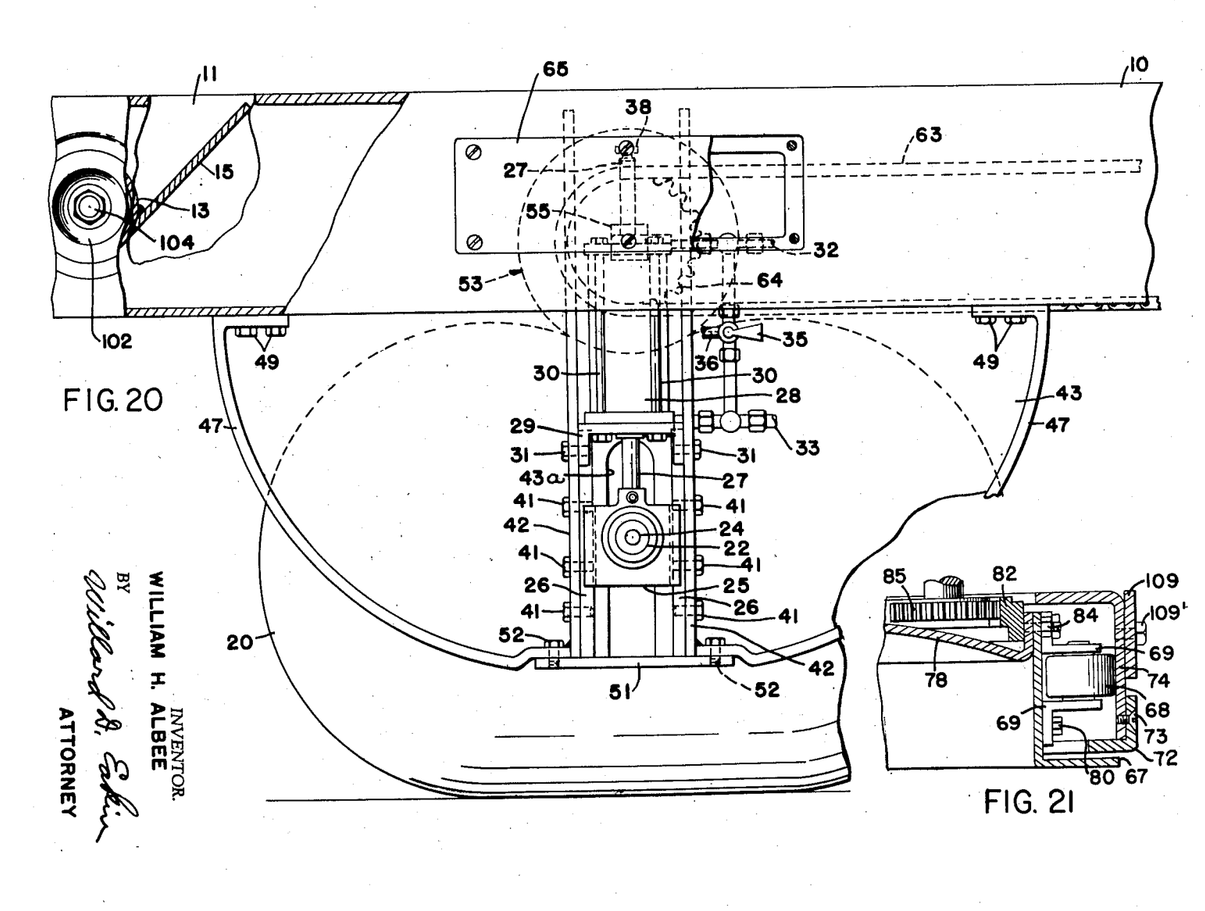
FIG. 20 is a fragmentary side elevation of rear-end parts as shown in FIG. 1 but on a larger scale and with parts broken away and sectioned.
FIG. 21 is a section taken on line 21—21 of FIG. 7.

The guide-rails 26, FIGS. 6, 8, 19 and 20, are secured by screw-bolts 41, 41, to spaced plates 42, 42, which are welded to and project from a flat mounting plate 43 as to the rear-end construction (FIGS. 19 and 20) or a curved mounting plate 44 as to the front-end construction (FIGS. 1, 6 and 8), secured as by screw bolts 45, 45, FIG. 19, or 46, 46, FIG. 6, to an adjacent chassis member. Each of the flat mounting plates 43 and the curved mounting plates 44 is vertically slotted upward from its bottom edge, as shown respectively at 43a, FIG. 19, and 44a, FIGS. 6 and 10, for accommodation of the respective end portion of the bag's axle 22.

A runner-like protective shoe for each end portion of each of the ground-contacting bags is provided by pairs of curved flange plates 47, 47 as to the rear-end construction (FIGS. 1, 4, 14 and 20) and 48, 48 as to the front-end construction (FIGS. 1, 4, 7 and 8), the said flange plates being welded to the adjacent mounting plates respectively and secured to an adjacent chassis member as by screw-bolts 49, 49, FIG. 20, or 50, 50, FIGS. 7 and 8. At their lower ends the flange plates of each pair terminate short of each other and have offset end portions which overlap a bridge plate 51 secured to them by screw bolts 52, 52, the construction being such that a substantially continuous and smooth lower surface of the shoe is provided for sliding over obstructions. The construction is such that the front-end guard shoes have their obstruction-engaging surfaces curved concentrically with relation to the steering axis and turn with the adjacent parts about that axis.

Each of the ground-contacting bags is peripherally loaded and driven through a single "saddle" roll, as distinguished from the plurality of such rolls in my above mentioned Patents 2,714,011 and 2,802,541, with advantages which will be hereinafter discussed.

The peripherally loading and driving means is the same for each of the two rear bags 20, 21.

Directly above its axle the bag is indented by and wholly supports a hollow, motor-containing saddle roll 53 (FIGS. 1, 4, 19 and 20) which is journaled at its ends, by bearings such as the bearing 54, FIG. 19, upon motor-supporting, non-rotating axle elements 55, 56 which are in rigid relation to the casing 89a of the motor 89 and have squared end portions 55 clamped from below in a complementary notch formed in a mounting block, 57 or 58 in the rear-end assembly, FIG. 19, or 57a, 58a, FIGS. 6 and 7, in the front-end assembly. The mounting blocks 57, 58, of the rear-end assembly, are secured respectively to the box-beams 10 and 11 by the screw-bolts 45, 45, FIG. 19, by which the mounting plates 43 are mounted as above described. The right-hand mounting block 58 and the axle element 56 are formed with communicating conduit holes, 58b and 56b, FIG. 6, for a pair of electric wires 59, 60 leading to the motor 89, within the saddle roll 53, FIG. 19, or 66, FIG. 6, from a motor-generator 61 (FIG. 1) mounted upon the chassis.

The saddle roll 53, FIG. 19, or 66, FIG. 6, comprises two shell sections, 53a, 53b, FIG. 19, or 66a, 66b, FIG. 6, separable at the middle, largest-diameter part of the roll, as at 62, FIG. 19, which permits the mounting of the motor 89 in and removing it from the roll. The saddle roll preferably is of such crowned form that at each position along their lengths the diameters of the saddle roll and of the bag in fully distended condition are in the same ratio, except for possible allowance for bag deformation, so that at each position axially of the bag and of the saddle roll they can have the same peripheral speed, in accordance with the invention described and claimed in my above mentioned Patent No. 2,802,541.

The motor will be more fully described hereinafter with reference to the front-end motor, of like construction, which is more fully shown in FIG. 6.

The like saddle rolls of the two rear-end bags, 20 and 21, whether driven by respective internal electric motors as herein shown or otherwise driven, preferably are drivingly connected by a sprocket chain 63 extending about sprockets 64, 64 (FIGS. 1, 3, 4 and 19) secured respectively upon end portions of the saddle rolls.

The box-beams 10 and 11 are formed with access openings, closed by respective removable plates 65, 65, at the positions of the saddle rolls.

In the front-end assembly the ground-contacting bag 19, and the saddle roll, 66, and their directly associated parts, and the equalizer device, are substantially the same as those described as to the rear-end assembly, but instead of being mounted upon vehicle-frame members are mounted upon a "fifth-wheel" element 67 which, for steering the vehicle, is mounted upon an axis (coinciding with the section line 6—6 in FIG. 1) which lies in a vertical fore-and-aft plane of the vehicle but is so inclined in that plane, in relation to the direction of travel, that turning of the "fifth wheel" element 67 lowers the end of the bag's axis that is at the inner side of the steered course and raises the other end thereof, thereby giving the crowned bag the directional characteristic of a conical roller, as described and claimed in my above mentioned Patent No. 2,802,541.

Figure 7:
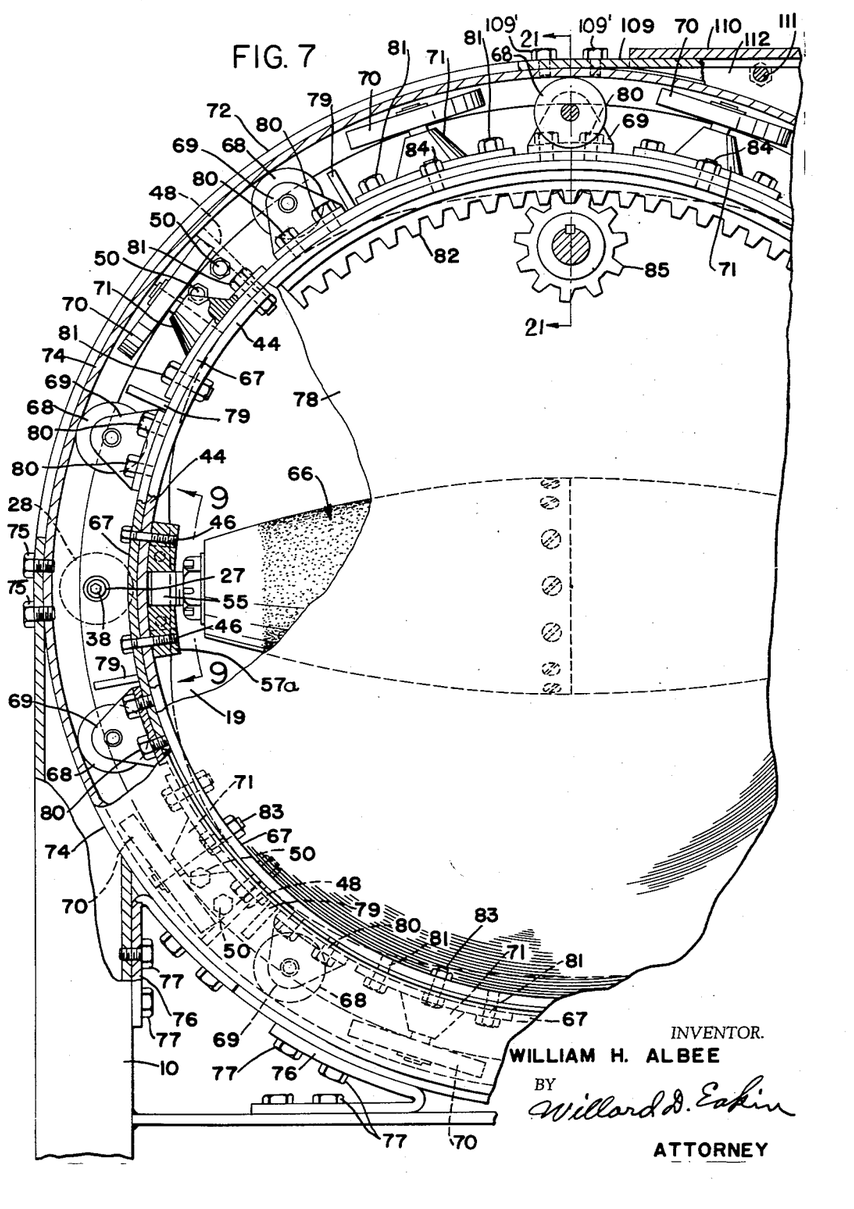
FIG. 7 is a plan view of parts of the front-end assembly partly broken away and sectioned on line 7—7 of FIG. 1.

The element 67 is a ring, of L shape in cross-section, FIG. 6, permissibly strengthened by bracket-plate braces 79, 79 welded in place, FIG. 7, and has radial-bearing, vertical-axis rollers 68, 68 journaled in brackets 69, 69 which are secured by screw-bolts 80, 80 to the outer face of the vertical part of the L-shaped ring, and thrust-bearing frame-supporting rollers 70, 70 journaled upon wide-based stub axles 71, 71, FIGS. 6 and 7, which are secured by screw-bolts 81, 81 to and project horizontally from, the outer face of the vertical part of the L-shaped ring.

The horizontal-axis, load-supporting, thrust-bearing rollers 70 have slight clearance from the upper face of a horizontal, inwardly projecting part of a cross-sectionally L-shaped raceway ring 72 of which the vertical part is secured by screws 73, 73 to the outer face of the lower margin of a cross-sectionally L-shaped, frame-supporting ring 74. The box-beam members, as clearly shown with regard to the member 10 in FIG. 7, are cut away to fit against the outer face of the ring 74, which is secured to them by bolts 75, 75 and by brackets 76, 76 and bolts 77, 77.

The radial-bearing rollers 68 run upon the inner face of the vertical part of the L-shaped frame-supporting ring 74 and the frame-supporting thrust-bearing rollers 70 run upon the lower face of its inwardly projecting horizontal portion. The words "vertical" and "horizontal" are used for brevity although all of the assembly being described is backwardly tilted with relation to the vehicle-frame box-beams, for conical-roller steering as above mentioned.

The annular frame-supporting member 74 defines a central opening large enough to permit the mounting and removal of a domed cover plate 78, FIGS. 6 and 7, formed with a marginal flange by which it is secured, by bolts 83, 83, to the upper margin of the ring 67, to strengthen the latter and for enclosure purposes.

Figure 4:
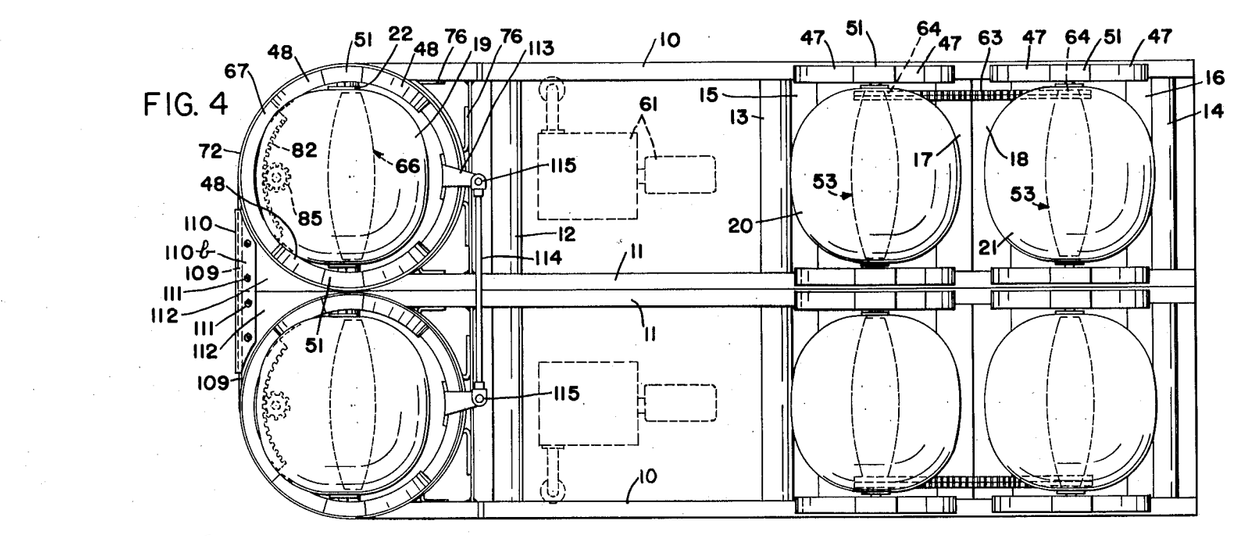
FIG. 4 is a view from below of the unitary assembly shown in FIGS. 2 and 3, taken on line 4—4 of FIG. 1.

For steering the vehicle by turning the structure comprising the bag, saddle roll, equalizer device, guard shoes, ring 67 and its bearing rollers, in relation to the structure, rigid with the vehicle frame, which comprises the frame-supporting ring 74, a gear-segment 82, FIGS. 4 and 7, is secured, by bolts 84, 84, FIG. 7, to the inner face of the marginal flange of the cover plate 78 and is meshed with a pinion-gear 85, FIGS. 7 and 1, which, through a bevel-gear assembly in a gear-box 86, has drive connection with a steering-wheel 87 in the cab of the vehicle.

In each of the saddle rolls 53, 53 and 66 the motor assembly, as shown clearly in FIG. 6 as to the front-end assembly, comprises the non-rotating axle elements 55, 56 which, inward from their bearing-supporting portions, are of hollow, open-end form and have their annular margins telescopically joined and secured by screw-bolts 88, 88, so that they provide a housing and mounting for an electric motor 89 suitably secured within a cylindrical part of the member 55 and having electric wires 90, 90a corresponding to the wires 59, 60 of the rear-end assembly, FIG. 19) extending to it from the motor-generator 61, FIG. 1.

The shaft 91 of the motor has secured upon it a sun-gear 92 adapted to drive the saddle roll 66 through planet gears 93, 93 and a gear-ring 94, the said gear-ring being secured to the inner face of the hollow roll by screws 95, 95 and the planet-gears projecting outward through holes 96, 96 in the non-rotating motor-housing structure and being journaled upon respective stud-shafts 97, 97 projecting from a plate 98 secured in the hollow part of the non-rotating axle member 55.

Figure 5:
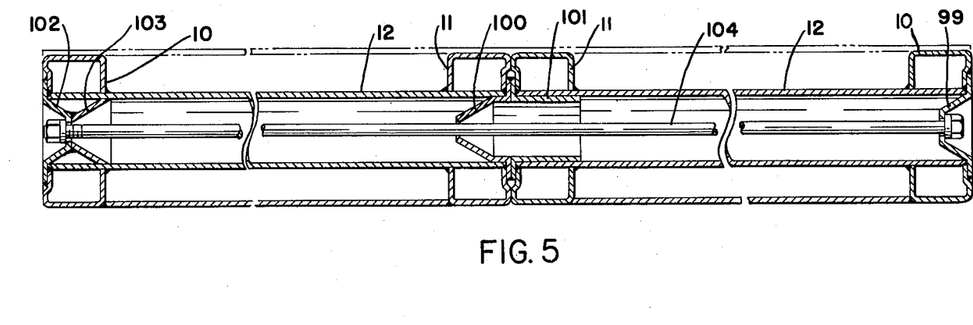
FIG. 5 is a section on line 5—5 of FIG. 1.

The features relating to the joining of two of the vehicles as a single unit are as follows:

Referring especially to FIGS. 1 to 5, each of the tubular cross-members 12, 13, 14 of the right-hand one of the two vehicles has mounted in its right-hand end, FIG. 5, and welded to it and to the adjacent box-beam as shown, a centrally apertured, inwardly-cupped, end-wall member such as the member 99, and in its left-hand end is mounted a permissibly removable, centrally apertured, tapered-dowel structure comprising shell members such as the members 100 and 101 formed at their adjacent ends with mutually abutting external flanges which are welded to each other at their outer peripheries.

Each of the tubular cross-members 12, 13, 14 of the left-hand one of the two vehicles has mounted in its left-hand end and welded to it and to the adjacent box-beam as shown in FIG. 5 a centrally apertured, inwardly cupped, end-wall member, such as the member 102 and a funnel-shaped guide member such as the member 103 having its smaller end abutting and welded to the small end of the end-wall member.

The member 103 is adapted to guide into the central aperture of the end-wall member 102 the front end of a long stay-bolt 104 when the latter is passed through the end-wall member 99 and the tapered-dowel structure 100—101 for bolting the two vehicles together, with adjacent box-beams 11 and 10 of the respective vehicles abutting each other as clearly shown in FIG. 5.

At the positions of the members 99, 100, 101 and 102 the box-beams are indented to permit those members to be flush with the adjacent faces of the box-beams.

In the joining of the two vehicles they are first driven into close side-by-side relation with the tubular cross-members 12, 13, 14 of each vehicle approximately in alignment with those respectively of the other vehicle, and preferably with the tapered dowels 100—101 projecting a little way into their mating members. The dowels, in being further drawn into the adjacent cross-members, are adapted to perfect such alignment and dowel the two vehicles to each other.

The high deformability of the bags permits substantial relative movement of the frames of the two vehicles for drawing them into their final relation without shifting of the ground contacts of the bags.

In FIGS. 17 and 18 is shown mechanical-advantage lever means for manually drawing the frames of the two vehicles into their final relationship. A T-shaped hand-lever 105 has each end of its T-head element overlapped upon and hinged to the inner end of a toggle link 106 which at its outer end has rigid with it a downwardly projecting pin 107 adapted to be engaged in a vertical hole 108 formed in the upper face of the adjacent box-beam frame-member. Horizontal turning of the lever provides a double-toggle effect for the purpose stated. If, as in these FIGS. 17 and 18, the two vehicles comprise respective bed plates, 112a, 112a, overlying and permanently fixed to the respective frames, the bed plates are of course formed with suitable holes (not shown) in registry with the holes 108.

Additional means can be provided for holding the front ends of the vehicle frames together in proper alignment and for fairing the front end of the combined assembly, as shown in FIGS. 1, 2, 4, 7 and 8. In the embodiment here shown each individual vehicle comprises a corner frame structure consisting of a vertical plate 109 and, felded thereto, a horizontal plate 112, FIGS. 4 and 8. The plate 109 is secured to the member 74 by bolts 109'. A tie member 110 of U shape in cross section, having an upper flange 110a and a lower flange 110b, straddles and connects the plates 109 of the vehicles and has its end portions secured to them respectively by bolts 111, 111 extending through its side-wall elements, just back of the vertical plates 109, and through the horizontal plates 112.

Figure 8:
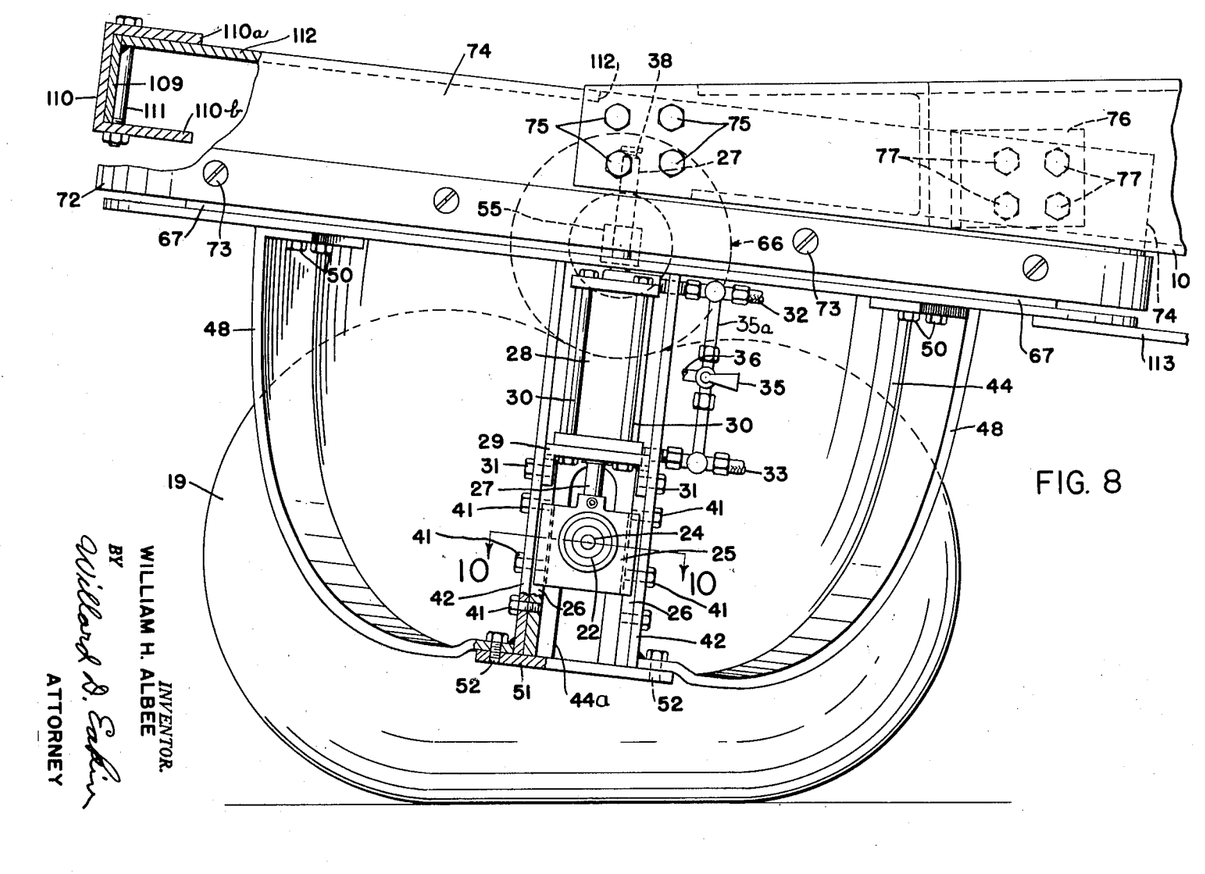
FIG. 8 is a side elevation of forward parts of the vehicle, as in FIG. 1, but on a larger scale.

For steering the twin vehicle, arms such as the arm 113, FIGS. 1, 4 and 8, are secured to and project from the respective members 67 (see also FIG. 6) and the outer ends of the two arms are connected by a link 114 (see especially FIGS. 1 and 4). As is clearly shown in FIG. 4, the arms 113 are pivoted to the ends of the link 114 at positions, 115, 115, which, when the front-end assemblies are in symmetrical position with relation to the vehicle frames, are somewhat inward from the fore-and-aft middle lines of the said assemblies, the link 114 being correspondingly short, so that, in being steered to right or left the ground-contacting bag on the outer side of the curved course of the twin vehicle will be turned slightly less than the bag on the inner side of the said curved course, and thus will be tilted less by reason of the inclination of the turning axis of the assembly. Being turned less and also tilted less, it will seek a curved course of greater radius of curvature than the bag on the innerside of the course does, to correspond to the different curvatures of the paths that they must take in the progress of the twin vehicle as a whole, with each of the bags having the advantage of the conical-roller effect, in correlated magnitudes, for minimizing of ground slippage as described and claimed in my above mentioned Patent 2,714,011 and its reissue, Re. 24,272, and Patent No. 2,802,541.

The use of the single saddle roll for each bag avoids waste of power as compared with the use of a plurality of such rolls as in my just-mentioned patent and copending application, by reducing bearing-friction loss and apparently also by providing a simpler and thus better correlation of the graduated peripheral speeds of the single crowned saddle roll, at various positions along its length, with the likewise graduated peripheral speeds of the crowned bag, the result being less power loss in distortions of the bag's wall and/or in local slippage of the roll surface and the bag surface on each other. In case of imperfections in such correlation, resulting from distortion of the bag wall by roadway obstructions or from any other cause, there is an ample reach of uncontacted bag wall, both ahead of and behind the saddle roll, to permit the slight stretching and recoil of the bag wall, and the yieldability of the contained fluid, to lessen or completely avoid local slippage of the two surfaces on each other, the bag wall having ample opportunity to resume normal shape while out of contact with both the ground and the saddle roll.

As the single saddle roll more deeply indents the wall of the bag, for a given loading of the vehicle, than the plurality of saddle rolls does, and deepens the indentation more when the bag passes over a road obstruction, the single saddle roll provides more effective use of the upper part of the bag for cushioning of the vehicle frame.

In the case of a self-propelled vehicle, the single saddle roll for each bag has ample driving engagement with the bag because its deep indentation of the bag provides a large area of "wrap-around" contact of the two, with the total engagement pressure of the two proportional to the large number square inches of such contact. While the drawing shows the rotational axes of the saddle roll and the roller to be vertically aligned, the saddle roll could be mounted to either side so long as, with the vehicle horizontal, the rotational axis of the saddle roll is higher than that of the roller and is between vertical planes tangent to the fore and aft peripheral extremities of the ground contacting portion of the roller wall. This relationship assures the mounting of the saddle roll so it will run on the upper surface of the roller to support the load.

The feature of the single saddle roll contributes importantly to the provision of a low center of gravity of the vehicle in conjunction with a long vertical range of cushioned movement of the vehicle frame, because the journal bearings of the saddle roll, with the deep indentation of the bag, are desirably close to the axle of the bag and the top of the single saddle roll can be within the vertical limits of the vehicle's frame members such as the box-beams 10, 11 and the front-end frame member 74.

An important feature in conjunction with the use of the single saddle roll, and the hereinafter discussed elimination of a walking-beam which the use of the single saddle roll permits, is the provision of horizontal-propulsion means, for compelling the vehicle and the bag to progress at the same ground speed, which keeps the axis of the bag directly under the axis of the saddle roll at all times while permitting the axis of the bag to have the long-range vertical cushioning movement, in relation to the saddle roll and the vehicle frame, that is incident to the deep indentation of the bag by the single saddle roll. This type of horizontal-propulsion means for the journals of the bag also make important the hydraulic type of equalizer above described.

The deep indentation provided by the use of the single saddle roll is an important factor also in lowering the vehicle's center of gravity by permitting elimination of a hinged mounting or "walking-beam" for a plurality of the bag assemblies mounted in tandem, as in the case of the assemblies comprising the rear-end bags 20 and 21 in FIGS. 1, 4, 14 and 20.

Figure 14:
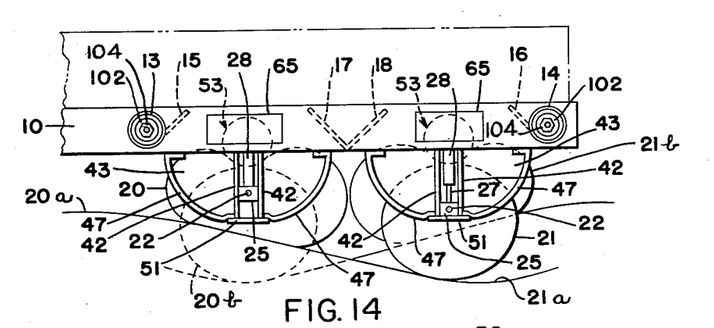
FIG. 14 is a diagrammatic side elevation of a group of four of the cushioning rollers and adjacent parts, illustrating the manner in which they make a "walking-beam" unnecessary.

The action that takes place in the passing over an uneven roadway of the vehicle not having the walking beam is shown in FIG. 14.

The bag being easily deformable, having very low distension pressure, and its load-supporting force being developed by increase of its areas of contact with the roadway and with the saddle roll, it can be deeply deformed, both top and bottom, in passing over a road obstruction and, by the same token, has a good capability of maintaining some of its ground pressure in passing over a roadway depression.

Referring to FIG. 14, the forward bag 20, on a high part 20a of the roadway, is shown as momentarily sustaining so much of the total load of the two bags 20 and 21 that the bag 21, on a low part 21a of the roadway, is completely relieved of load.

Each of the bags is capable of withstanding such momentary overloading because its distension pressure is low even when it is thus extensively deformed and because its wall strains, proportional to the radii of curvatures, is moderate because of the small radii of curvature of the more sharply curved wall portions.

While FIG. 14 shows a roadway of only wavy contour, the same principle applies in the case of more abruptly acting road obstructions or depressions. In all cases, the bags' high range of cushioning deformability causes the ground-contact area to be adequately spread and/or distributed among the bags to sustain the load without rupturing increase of distension pressure and without the need of a walking-beam for equalizing of load upon the bags.

In FIG. 14 the corresponding bags, 20b, 21b, of the farther one of the twin vehicles are shown as passing over a road contour, and performing in a manner, of converse relation to the concurrent road contour and action of the bags 20 and 21, the total normal load of the four bags being momentarily sustained wholly by the two diagonally opposite bags 20 and 21b. The guard and strengthening plates 15, 16, 17, 18 provide smooth surfaces for limiting the momentary extension of the upward bulges of the rotating bags in case of either bag passing rapidly over an abrupt road obstruction.

The "fifth-wheel" assembly as described is of importance in conjunction with the single-saddle-roll feature and the no-walking-beam feature because it provides vertical compactness of the front-end structure, corresponding to that of the rear-end structure, and thus permits a low center of gravity for the vehicle.

The use of the single saddle roll, in providing large-amplitude, low modulus, cushioning action of the upper part of the roll, contributes greatly to the continued sustaining of a substantial part of the load by any one of the tandem rollers while it bears upon a relatively low part of the roadway surface.

Mounting of the guard directly upon the chassis structure holds the guard at a mean elevation in relation to the rollers of the set, so that the axle of a roller passing over an obstruction can have an extensive rise in relation to the guard, because of the large amplitude cushioning action at the top of the roll, and the vulnerable end portions of the roll thus rise from the danger zone. Also use of the single saddle roll, making important the restriction of the roller's axis to direct vertical movement for keeping it directly under the saddle roll and maintaining equality of the roller's upward bulges, makes desirable the use of vertically sliding bearing blocks for the roller, and a good mounting for the guard can be provided more readily by mounting the guard directly upon the chassis structure than by mounting it upon the bearing block; and also it acts directly and positively as outrigger means for limiting lateral tilting of the chassis.

In the tandem arrangement (see especially FIG. 14) the positive drive connection between tandemly related rollers prevents the less heavily loaded roller, or load-relieved roller, from spinning, as it might do if driven by a motor individual to it, as herein contemplated, or in case of differential gearing being interposed between the two rollers.

The internal drive for the saddle rolls avoids the need for differential gearing in the twin-vehicle's rear-end assembly and, in the front-end assembly of each vehicle, simplifies the problem of transmission of torque for front-end drive.

The internal drive is better suited to an assembly having a single saddle roll for each bag than one having a plurality of saddle rolls for each bag, because the single saddle roll, sustaining the entire load of the bag, with an extensive wrap-around of the bag wall, with a given pressure per square inch, has much stronger tractive engagement with the bag than could be obtained by the use of an internal drive for one only of the plurality of saddle rolls.

All of the features above discussed are of importance in conjunction with the described means for joining two of the vehicles as a single unit, the result of their use in combination being a dual vehicle of desirably low center of gravity, low bed, and large bed area.

However, some of the features can be omitted, and various modifications are possible, without departure from the scope of the invention as defined in the appended claims.

What is claimed as new is:

1. A vehicle comprising a hollow, flexible-walled, fluid-distensible, ground-contacting roller, a load-sustaining structure, load-sustaining rotary means journaled on said structure and running upon a surface of said ground-contacting roller for applying the load thereto, a motor within said rotary means, and reaction-sustaining means and power-supply means both extending from the said structure, through a journal of said rotary means, to said motor.

2. A vehicle comprising a vehicle chassis structure, yielding ground-contacting means having force-transmitting relation to the right and left sides of the said structure respectively for supporting it from the ground, and also having equalizer means for urging the right and left sides of the said structure to have like vertical movement in relation to the ground in passage of the vehicle over an uneven roadway, said equalizer means comprising, for each side of said structure, a fluid-impelled member and means therewith defining a variable-volume chamber above said member and a variable-volume chamber below it, said fluid-impelled member and said chamber defining means respectively being connected to and impelled by respective ones of the said chassis structure and the respective ground-contacting means, fluid-conducting means through which the chamber above said member at one side of said structure is in closed communication with the chamber below said member at the other side of said structure, and fluid-conducting means through which the chamber below said member at the first mentioned side of said structure is in closed communication with the chamber above said member at the other side of said structure, and means for venting all air from the top of each of the four variable-volume chambers regardless of the position of the fluid-impelled member in relation to the chamber defining means, the said chambers and the said fluid-conducting means alone constituting a self-contained, closed, hydraulic system, with the said equalizer means in functioning relation on the vehicle.

3. A vehicle comprising a load-sustaining structure, at least one load-sustaining saddle roll, means journaling the saddle roll on the load-sustaining structure for rotation about an axis transverse to the line of travel of the vehicle and for supporting the load-sustaining structure, a separate roller in contact with each saddle roll and disposed between the saddle roll and the supporting surface or ground, said roller being hollow, flexible-walled, fluid-distensible and, under load, flattened against the supporting surface throughout a part of its outer wall with a footprint that is of greater length in the direction of the rotational axis of the roller than in the direction of travel of the vehicle, means journaling the roller to the load-sustaining structure with, when the vehicle is disposed on horizontal terrain, the rotational axis of the saddle roll located higher than the rotational axis of the roller and within vertical planes tangent to the fore and aft extremities of the ground contacting portion of the roller wall, whereby the saddle roll runs upon the outer surface of said roller at a localized, single position peripherally of the roller applying at least a major portion of the load thereto.

4. The vehicle of claim 3 in which the means journaling the roller to the load-sustaining structure includes axle means projecting from each end of the roller and wherein guide means are provided for each of said axle means of said roller to permit relative movement of the load-sustaining structure in a generally vertical sense but to prevent relative lateral movement and equalizer means interposed between the load-sustaining structure and the axle means of said roller compelling the two projecting axle means to have the same vehicle cushioning movements toward and from the load-sustaining structure.

5. The vehicle of claim 4 in which the equalizer means is hydraulic.

6. The vehicle of claim 4 in which the equalizer means is hydraulic and comprises, for each side of the roller, a fluid impelled member and means defining a variable-volume chamber above said member and a variable-volume chamber below it, said fluid impelled member and said chamber defining means being connected to and impelled by respective ones of the defined load-sustaining structure and the roller, fluid-conducting means through which the chamber above said member at one side of said structure is in closed communication with the chamber below said member at the other side of said structure, and fluid-conducting means through which the chamber below said member at the first-mentioned side of the vehicle is in closed communication with the chamber above said member at the other side of said structure, the said chamber and the said fluid-conducting means alone constituting a self-contained, closed, hydraulic system.

7. The vehicle of claim 4 in which the journal means for the saddle roll holds the rotational axis of the latter in a substantially fixed position relative to the load-sustaining structure.

8. The vehicle of claim 3 wherein motor means are mounted within the saddle roll with means for applying its reaction against the load-sustaining structure and having driving relation to the roller.

9. The vehicle of claim 3 which includes a plurality of pairs of said saddle rolls and rollers with the defined mounting relative to the load-sustaining structure, and means for holding the rotational axis of each of the said rollers in a vertical plane fixed in relation to said load-sustaining structure during all operations of the vehicle.

10. A vehicle comprising two separable, elongated frames arranged in side-by-side relationship, each of said frames mounted for independent rolling movement on a plurality of rollers journaled thereto; the rollers being hollow, flexible-walled, fluid-distensible, and, under load, flattened against the ground or other supporting surface throughout a portion of their outer walls with footprints that are of greater length in the direction of the rotational axis of the rollers than in the direction of vehicle travel; a plurality of abutment surfaces formed along one side of each frame and spaced widely along the fore and aft dimension of the frames, the abutment surfaces on the two frames being arranged to confront and abut one another when the frames are in side-by-side relationship; and releasable means connecting the two frames and forcing them toward each other to maintain a close seating of the confronting abutment surfaces, whereby a rigid, double width single vehicle may be formed or readily dismantled for operation as separate units.

11. A vehicle comprising two separable, elongate frames arranged in side-by-side relationship, each of said frames mounted for independent rolling movement on a plurality of rollers journaled thereto; the rollers being hollow, flexible-walled, fluid-distensible, and, under load, flattened against the ground or other supporting surface throughout a portion of their outer walls with footprints that are of greater length in the direction of the rotational axis of the rollers than in the direction of vehicle travel; a plurality of cross members each with a passage therethrough and rigidly mounted on each frame as a structural part thereof and extending substantially perpendicularly to the direction of travel of the vehicle, said cross members being widely spaced fore and aft of the frames and, with the frames standing side by side being in alignment, abutment faces on the confronting ends of the cross members of the two frames adapted to seat one on the other, and releasable means extending through aligned cross member passages and engaged with the outside portions of the respective cross members for urging the confronting abutment faces into tight seating relationship whereby the frames are secured together to serve as a double width vehicle and may be readily dismantled to serve as two separate units.

References Cited in the file of this patent
UNITED STATES PATENTS

| | | |
|---|---|---|
| Re. 24,272 | Albee | Feb. 12, 1957 |
| 668,434 | Benedict | Feb. 19, 1901 |
| 1,004,719 | Wissler | Oct. 3, 1911 |
| 1,158,680 | Griffin | Nov. 2, 1915 |
| 1,160,941 | Moore | Nov. 16, 1915 |
| 1,310,604 | Burgess | July 22, 1919 |
| 1,394,328 | Miller | Oct. 18, 1921 |
| 1,436,373 | Walk | Nov. 21, 1922 |
| 1,675,013 | Young | June 26, 1928 |
| 1,680,648 | Thoen | Aug. 14, 1928 |
| 1,897,944 | Carter | Feb. 14, 1933 |
| 1,920,390 | Helms | Aug. 1, 1933 |
| 1,943,734 | Konetsky | Jan. 16, 1934 |
| 1,944,333 | Toupin | Jan. 23, 1934 |
| 2,278,081 | Kramer | Mar. 31, 1942 |
| 2,429,302 | Abbe | Oct. 21, 1947 |
| 2,551,231 | Anderson | May 1, 1951 |
| 2,638,354 | Larson et al. | May 12, 1953 |
| 2,669,461 | Raney | Feb. 16, 1954 |
| 2,684,254 | Goss | July 20, 1954 |
| 2,779,587 | Thomas | Jan. 29, 1957 |
| 2,802,541 | Albee | Aug. 13, 1957 |
| 2,821,949 | Uyehara | Feb. 4, 1958 |
| 2,824,592 | Neisler, et al. | Feb. 25, 1958 |

FOREIGN PATENTS

| | | |
|---|---|---|
| 576,477 | Great Britain | Apr. 5, 1946 |

OTHER REFERENCES

Automotive Industries: June 15, 1955; vol. 112; No. 12; page 67.